Figure 11:
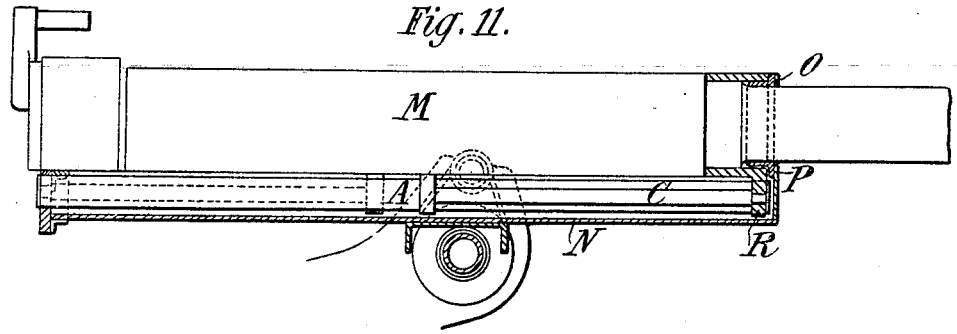

No. 843,522. PATENTED FEB. 5, 1907.
J. A. DEPORT.
COMPRESSED AIR BRAKE FOR GUNS THAT RECOIL ON THEIR CARRIAGES.
APPLICATION FILED DEC. 11, 1906.
3 SHEETS—SHEET 1.
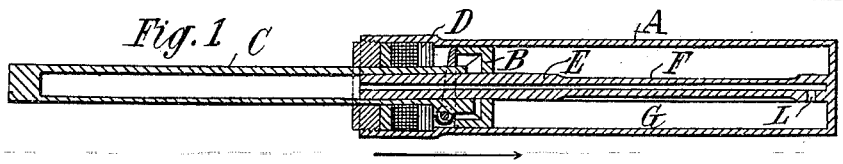
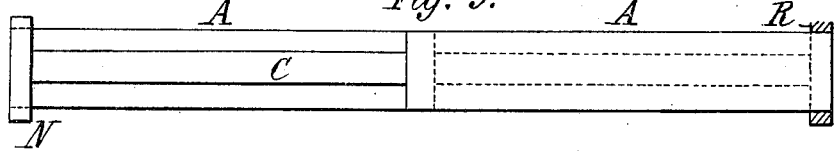
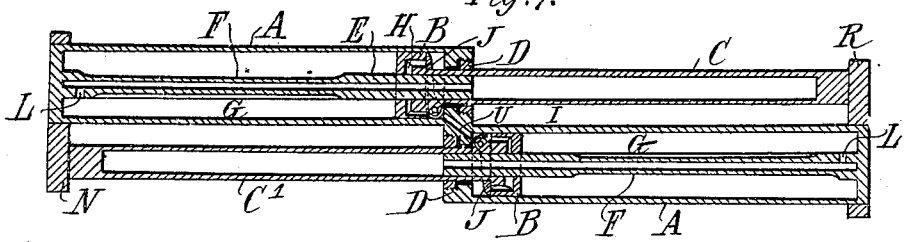
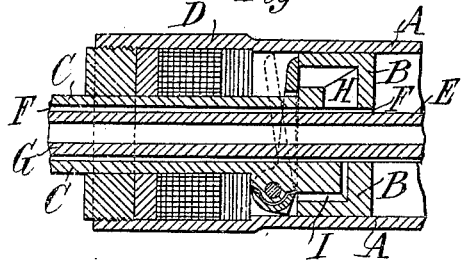
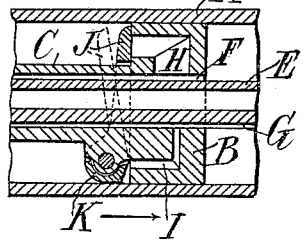
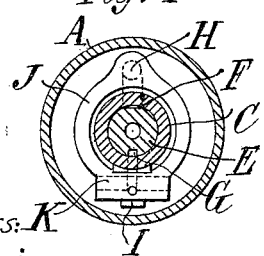
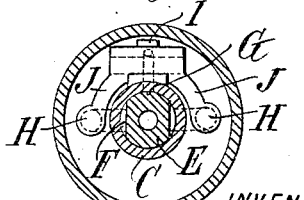
WITNESSES:
INVENTOR:
Joseph Albert Deport,
By his Attorneys.

No. 843,522. PATENTED FEB. 5, 1907.
J. A. DEPORT.
COMPRESSED AIR BRAKE FOR GUNS THAT RECOIL ON THEIR CARRIAGES.
APPLICATION FILED DEC. 11, 1906.
3 SHEETS—SHEET 2.
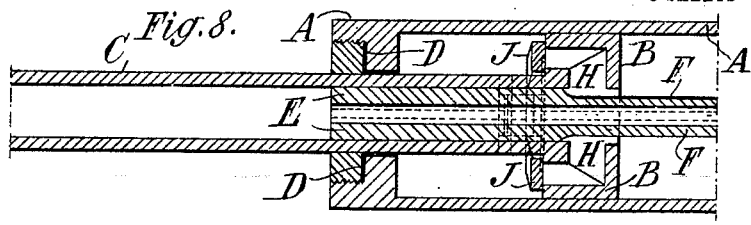
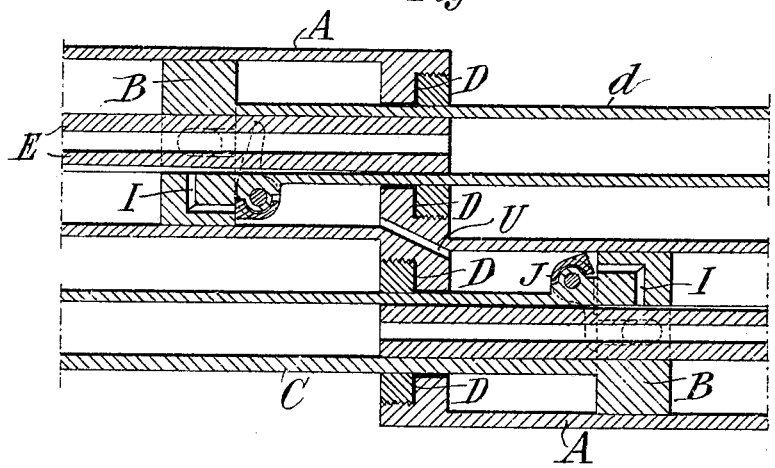
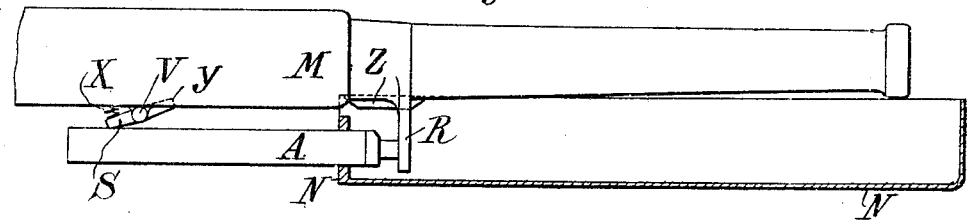
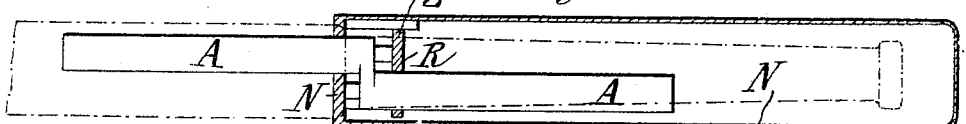
WITNESSES:
Rene' Muire
J. W. Wallach
INVENTOR:
Joseph Albert Deport.
By his attorneys,
Arthur E. Frazer & Usina No. 843,522. PATENTED FEB. 5, 1907.
J. A. DEPORT.
COMPRESSED AIR BRAKE FOR GUNS THAT RECOIL ON THEIR CARRIAGES.
APPLICATION FILED DEC. 11, 1906.

3 SHEETS—SHEET 3.

WITNESSES:
Rene Bruine
J.F. Wallach

INVENTOR:
Joseph Albert Deport,
By his Attorneys.
Arthur E. Chaser & Urina

UNITED STATES PATENT OFFICE.

JOSEPH ALBERT DEPORT, OF PARIS, FRANCE.

COMPRESSED-AIR BRAKE FOR GUNS THAT RECOIL ON THEIR CARRIAGES.

No. 843,522. Specification of Letters Patent. Patented Feb. 5, 1907.

Application filed December 11, 1906. Serial No. 347,366

*To all whom it may concern:*

Be it known that I, JOSEPH ALBERT DEPORT, a citizen of the Republic of France, residing in Paris, France, have invented certain new and useful Improvements in Compressed-Air Brakes for Guns that Recoil on Their Carriages, of which the following is a specification.

Nearly all modern guns are provided with a hydraulic brake interposed between the gun and its carriage in order to absorb the greater part of the energy of the recoil and also with spring or compressed-air recuperators, dependent on or independent of the brake, which store up the rest of this energy and use it to return the gun to the firing position; but the hydraulic brake with its recuperators forms an addition to the gun which is heavy, cumbersome, and troublesome, demanding much supervision and maintenance. These difficulties have proved sufficiently serious to militate against the adoption of guns recoiling on their carriages in the case of ordnance on wheels, notwithstanding the considerable advantages thereof.

The action of a hydraulic brake which acts on an incompressible liquid differs considerably from that of compressed-air brakes, because of the compressibility and the expansibility of the air and of the perturbing effects of pressure and temperature and of the difficulty of making the brake air-tight.

If a pneumatic brake is to be usefully applied to a piece of ordnance, it must be always ready without having to be recharged or initially regulated. Its action must be regular and must increase or decrease, according to the law imposed by the data of the problem. Its stroke must be sensibly constant and without final shock at the end of the recoil or of the return in spite of the variations of the energy of the recoil due to differences of initial velocities and the weights of the projectiles and the elevations, in spite of the variable temperature of the surrounding air, in spite of the heat developed by the action of the brake itself and the heat imparted to the brake by radiation or conduction when the gun has been heated by rapid firing. I have succeeded, however, by adopting special devices in making a recuperative brake working with compressed air which fulfils the aforesaid requirements completely. This recuperating brake consists, essentially, of a cylinder containing compressed air, of which the head, provided with a tight joint, is traversed by the rod of a piston-plunger situated within the cylinder and having an automatic valve. The gun in its recoil drives the piston into the cylinder and the valve makes communication through orifices of variable cross-sections between the spaces in front of and behind the piston, resembling in this respect certain hydraulic brakes. As, however, this new recuperating brake is charged with air under pressure and not with an incompressible liquid, like the hydraulic brakes, its mode of action is entirely different. The air which flows during the recoil from one side of the piston to the other exerts on this latter a counter-pressure, whereby the piston is subjected to the differential action of the pressure and the counter-pressure exerted on its two surfaces. This pressure and counter-pressure can be regulated by varying the dimensions of the passages for the air, so that the action or the effective resistance of the piston follows a suitable law. It is thus possible to obtain even a diminishing action of the brake, although the manometric pressure continues to decrease in the cylinder on account of the withdrawal therefrom of the piston-rod. Moreover, in this recuperating air-brake it is the same mass of gas which owing to its expansion develops a force sufficiently small and suitable to insure exact return to the firing position without shock.

The invention is illustrated in the accompanying drawings, in which—

Figure 13:
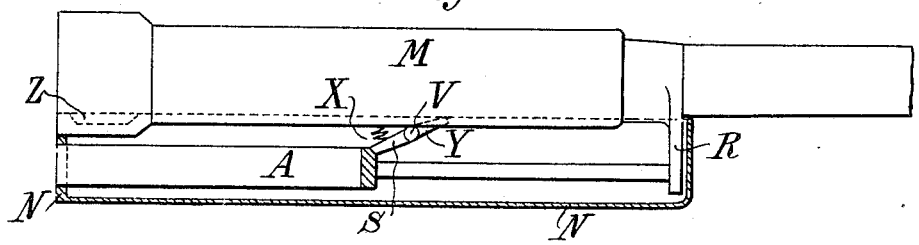
Figure 14:
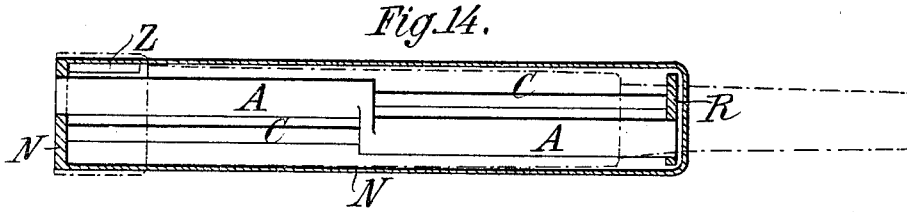
Figure 12:
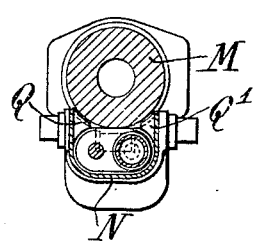
Figure 15:
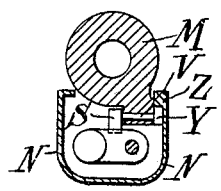

Figure 1 is a longitudinal section of the brake constructed with a single cylinder. Fig. 2 is a part longitudinal section, drawn to an enlarged scale, showing the stuffing-box. Figs. 3 and 4 are, respectively, a longitudinal section and a transverse section through the piston. Fig. 5 is a side elevation, Fig. 6 a cross-section, and Fig. 7 a sectional plan, of a brake having two cylinders inverted with respect to each other. Fig. 8 is a vertical section, Fig. 9 a horizontal section, and Fig. 10 a transverse section, showing the construction of the piston and drawn to an enlarged scale. Fig. 11 shows in elevation a brake made according to the invention interposed between a gun recoiling on its carriage and the cradle which turns on the trunnions and supports and guides the gun. Fig. 12 is a transverse section of the same. Fig. 13 is an elevation of a gun provided with a brake according to the invention and with a device for utilizing the mass of the brake at the beginning of the recoil. Fig. 14 is a plan, and Fig. 15 a cross-section thereof. Fig. 16 is an elevation of the same gun in the position which it has at the end of the recoil. Fig. 17 is a plan of the same view.

Referring to Fig. 1, the brake consists of a strong air-tight cylinder A, filled with compressed gas or air at a suitable pressure. Within the cylinder slides a piston-plunger B, whose rod C, which is hollow, slides in a stuffing-box D at the head of the cylinder. (Shown drawn to an enlarged scale in Fig. 2.)

Fixed within the cylinder at its closed end is a rod E, which forms a sliding fit in the bore of the piston-rod. On the outer surface of this rod E are two longitudinal grooves of varying cross-section F and G. These extend along the greater part of the length of the rod, which is itself hollow and has a perforation L at the end near the closed end of the cylinder, the purpose of which is to allow air to flow in and out of the piston-rod as this is withdrawn from or enters the cylinder.

The grooves F and G are designed, as will be seen, to control the escape of the air from one side to the other of the piston, groove F being for the purpose of regulating the recoil and groove G for the purpose of regulating the return to the firing position. For this purpose the front and rear spaces of the cylinders are not in direct communication, but are put in communication through the piston which is specially constructed with this object.

Referring to Figs. 3 and 4, there are two passages H and I through the piston, of which H opens communication between the front and rear of the piston through the recoil-groove F, while I opens communication through the return-groove G. On the face of the piston is a flap-valve J, turning on a pivot K. This valve has a wing and a tail, each provided with a suitable seating for hermetically closing the passage H during the return and passage I during the recoil, respectively. This automatic movement of the valve is produced by the passage of the air through the passages according to the direction in which the piston is moving. When the piston moves in the direction of the arrow shown in Figs. 1 and 3—that is to say, when it is driven into the cylinder during the recoil—the air moves valve J into the position shown in dotted lines in Fig. 3, thus opening the recoil-passage H and closing the return-passage I. When, on the other hand, the piston is moving in the direction opposite to that of the arrow, the pressure of the air forces the valve J against the piston, and thus closes the recoil-passage H and opens the return-passage I.

The recuperating brake is connected, on the one hand, to the gun either by its piston-rod or by its cylinder, and on the other hand, with the cradle carried by the gun-carriage.

The brake operates as follows: At the beginning of the recoil the manometric pressure of the air is the same on each side of the piston, so that the apparatus acts on the gun only by the difference of the sections subjected to the air-pressure—that is to say, the section of the piston-rod C—but when the piston is driven into the cylinder under the pressure of the recoiling gun it presses the air in the direction of the recoil movement and on the opposite side a very rapid expansion or vacuum, for behind the annular surface of the piston there is only the volume of air which remains in the dead space. The motion of the piston causes the valve to close the return-passage and to open the recoil-passage. This, however, has no effect until the passage H arrives at the recoil-groove F in the rod E. At this initial period of the recoil when no communication has been established between the two sides of the piston one of these sides supports the increasing pressure of the air over its whole section, while the vacuum is produced very rapidly on the opposite face, so that it is possible with a brake of small diameter inclosing air at only slightly-raised pressure to attain with rapid working the maximum resistance imposed on the brake by the conditions of the problem. At this moment the communication is established between the two sides of the piston by the recoil-groove having varying section, and the effective resistance of the brake is due to the difference of the pressures on the two sides of the piston—a difference that can be regulated according to any desired law.

When the momentum of the gun is spent and the recoil at an end, the manometric pressure of the air becomes equal on both sides of the piston; but inasmuch as the annular surface on one side is of smaller section than that on the other the pressure of the air acts on the face far from the piston-rod to an extent corresponding with the section equal to that of the piston-rod to return the gun to the firing position. This movement turns the valve into the position in which it closes the recoil-passage and opens the return-passage.

The return movement tends to produce compression on one side of the piston and expansion on the opposite side, the curve representing the change varying according to the return-groove. Thus it can be arranged that the speed of the return shall follow any desired law and shall be reduced to *nil* without shock when the cannon has again assumed the firing position.

Generally the recoil and return grooves do not extend along the whole length of the rod E, but are terminated at a few centimeters from each end of the latter in order that there may exist a buffer of imprisoned air which can only escape by the very little play around the piston. This buffer insures prevention of shock should the conditions of firing become abnormal, and thus tend to accidental shock.

An important remark to make, confirmed by experience, is that this brake adapts itself automatically to a great extent to the conditions of firing, of temperature, and of varying pressure—that is to say, the differences in the length of the recoil are very small compared with the variations under the aforesaid conditions. This is due to the fact that the effective resistance developed by the brake is the difference between the compression and the expansion which it produces on one side and the other of the piston, as has been already explained, and to the fact that this difference depends on the speed of the passage of the air. This speed of passage varies with the momentum to be absorbed with the pressure and with the increase of pressure due to temperature. The brake is thus practically compensated for variations in the conditions of firing.

After this explanation of the construction and operation of the new recuperating compressed-air brake there will now be described the special form which I have given it for ordnance having long recoil—for example, a brake which has been adapted to field-ordnance of seventy-five millimeters caliber of the rapid-firing type, having a long recoil on its carriage.

To obtain the long recoil which is essential for rapid-firing ordnance without making the brake too long, I have constructed a brake having two cylinders coupled together and inverted with respect to each other like the type of compressed-air recuperator which I have already described as an adjunct to a hydraulic brake; but since the present apparatus is to act not as a simple recuperator annexed to a hydraulic brake, but as a brake and compressed-air recuperator to the exclusion of any hydraulic or other brake, each cylinder is constructed as a recuperating brake. For this purpose it is provided with a rod having a recoil-groove and a return-groove and with a valved piston, as has already been described, to control the passage of the air from one side of the piston to the other during the recoil and the return.

Figs. 5, 6, and 7 illustrate a two-cylinder brake of this type with valves and pistons like those above described.

In Figs. 8, 9, and 10 there are two-recoil-grooves F F' in each rod instead of the single groove of the construction first described. Consequently the valve J has two seatings for closing the recoil-passages and one seating for closing the return-passage.

Referring to Figs. 11 and 12, the gun M is carried and guided in its trunnion-cradle N by the guides O, P, Q, and Q'. The gun carries an arm R, connected with the piston-rod C of the two-cylinder recuperating brake. (Shown in section in Fig. 7.) These two cylinders communicate freely with each other through a small channel $u$. The fixed piston-rod C' bears against the bottom of the cradle at its rear. When the gun recoils, the rods C C' are driven into their cylinders, the movable rod being pushed by the gun and the adjacent cylinder being itself pushed on the fixed rod by the recoil of the gun. This arrangement permits a stroke twice as great as if the brake had a single cylinder of the same total length. Each cylinder during the recoil plays the part of a compressed-air brake, and when the recoil is at an end the expansion of the air pushes forward the cylinder of the recuperating brake and the gun to return the latter to the firing position.

Evidently instead of using a single recuperating brake between the gun and its cradle two or even more than two brakes may be used. Thus instead of constructing each apparatus with two cylinders inverted with respect to each other the brake may be made with two cylinders on one side and a cylinder arranged inverted with respect to these two, this cylinder being the more important.

To utilize still better this recuperating brake with inverted cylinders, I have devised a way of utilizing the mass of the brake at the beginning of the recoil.

Figs. 13-17 show, by way of example, merely a method of automatically engaging the body of the brake so as to utilize its mass at the beginning of the recoil. A is the body of the brake; M, the gun; R, the engaging arm; N, the cradle, and S a catch pivoted at V beneath the gun and in contact with the body of the brake. The spring X keeps the catch depressed. The catch has a disengaging tail Y. Z is a ramp fixed to the cradle and determining the disengagement of the catch when in consequence of the recoil the tail Y rides against it. At the end of the return to the firing position the catch S again engages with the face of the body of the brake under the action of the spring Z.

Having thus described the nature of my said invention and the best means I know of carrying the same into practical effect, I claim—

1. A compressed-air brake for a gun that recoils on its carriage, comprising a cylinder, a piston working therein, a hollow rod fixed axially within the cylinder and provided with independent passages for establishing communication between the portions of the cylinder on opposite faces of the piston on recoil and return, and means operative on the recoil and return movements of the gun for alternately opening and closing said passages.

2. A compressed-air brake for a gun that recoils on its carriage comprising in combination an air-tight cylinder, a piston sliding therein, passages through the said piston, an automatic valve controlling the said passages, a hollow rod fixed axially within the said cylinder, a longitudinal groove on the external surface of the said rod adapted only for passage of air during the recoil, a second longitudinal groove on the external surface of the said rod adapted only for passage of air during the return to the firing position, the said grooves being of such cross-section that a differential pressure is set up on the faces of the piston.

3. A compressed-air brake for a gun that recoils on its carriage comprising a cylinder, a hollow rod fixed axially within the cylinder and provided with independent passages, a piston working within the cylinder over said rod and provided with independent ports therein coöperating with the passages in the hollow rod to establish communication between the portions of the cylinder on opposite faces of the piston on recoil and return, and means for automatically alternately opening and closing the ports in the piston during the recoil and return movements of the gun.

4. A compressed-air brake for a gun that recoils upon its carriage, comprising in combination two cylinders inverted in respect to each other and coupled together, and means for engaging the mass of the brake with the gun at the beginning of the recoil, and means for subsequently disengaging the mass from the gun automatically at a suitable time.

5. A compressed-air brake for a gun that recoils on its carriage comprising a cylinder, a hollow rod fixed axially within the cylinder and provided with independent passages, a piston working within the cylinder over said rod and provided with independent ports of different area coöperating with the passages in the hollow rod to establish communication between the portions of the cylinder on opposite faces of the piston, and means for automatically alternately opening and closing the ports in the piston during the recoil and return movements of the gun.

6. A compressed-air brake for a gun that recoils on its carriage comprising a cylinder, a hollow rod fixed axially within the cylinder and provided with independent passages, a piston working within the cylinder over said rod and provided with independent ports of different area therein coöperating with the passages in the hollow rod to establish communication between the portions of the cylinder on opposite faces of the piston, and a flap-valve carried by said piston and adapted to close one of said ports during the movement of the piston in one direction and the other of said ports during the movement of the piston in the other direction.

In witness whereof I have hereunto signed my name in the presence of two subscribing witnesses.

JOSEPH ALBERT DEPORT.

Witnesses:
JULES ARMENGAUD, Jeune,
H. C. COXE.